United States Patent [19]

Thompson

[11] 4,279,145

[45] Jul. 21, 1981

[54] FUEL EFFICIENCY DISPLAY

[75] Inventor: Vernon F. Thompson, St. Louis, Mo.

[73] Assignee: Tomco, Inc., St. Louis, Mo.

[21] Appl. No.: 106,555

[22] Filed: Dec. 26, 1979

[51] Int. Cl.³ .......................................... G01M 15/00
[52] U.S. Cl. ..................................................... 73/115
[58] Field of Search ......................... 73/115, 116, 114; 340/60; 116/272, 273

[56] References Cited

U.S. PATENT DOCUMENTS

| | | | |
|---|---|---|---|
| 2,430,413 | 11/1947 | Schulz | 116/272 X |
| 3,922,909 | 12/1975 | Dixson et al. | 73/115 |

*Primary Examiner*—Jerry W. Myracle
*Attorney, Agent, or Firm*—Polster, Polster and Lucchesi

[57] ABSTRACT

A fuel efficiency display device, in the form of an intake manifold suction measuring and display intended to be mounted within the passenger compartment of an internal combustion engine propelled vehicle, includes an elongated housing with a hollow open bottomed outer shell with a mounting boss extending lengthwise of it, a central, open ended sleeve with a cylindrical bore, the sleeve being spaced from and connected to an inside wall of the shell by spiders and a sight tube, fitting within the sleeve, through which an indicator spool slides. The sight tube has an annular shoulder which abuts the upper end of the sleeve. The open lower end of the shell and the sight tube are so proportioned and configured as to provide a press fit with a truncated conical part and a cylindrical boss of a conventional diaphragm assembly, operatively connected to the indicator spool so as to move the spool past sight ports in the sight tube in response to variations in the suction in the intake manifold, to which the diaphragm assembly is connected.

4 Claims, 9 Drawing Figures

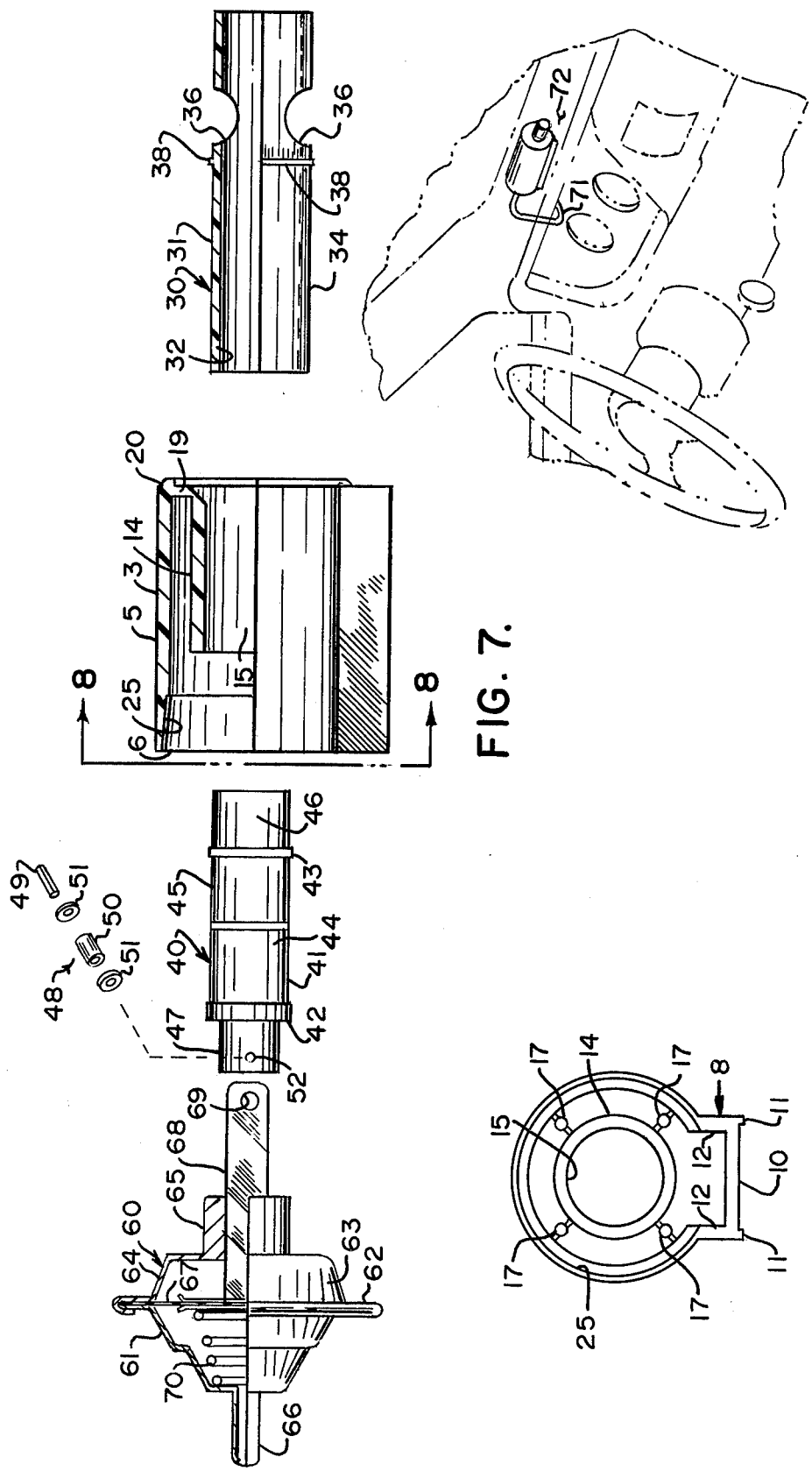

4,279,145

FUEL EFFICIENCY DISPLAY

BACKGROUND OF THE INVENTION

The efficiency of any automobile or truck depends not only upon the design of the engine but upon the way the vehicle is driven. It is highly desirable to provide a simple indication to the driver of the way in which his driving is affecting the fuel consumption of the vehicle. Devices for displaying the suction or negative pressure of the intake manifold, are known. The object of the present invention is to provide such a device which is attractive, economical to manufacture and effective.

SUMMARY OF THE INVENTION

In accordance with this invention, generally stated, an intake manifold suction measuring and display device is provided with an elongated housing, with a hollow open bottomed outer shell having a flat faced mounting boss extending lengthwise of and along the outside of the shell, a central, open ended sleeve with a cylindrical bore, spaced from and connected to an inside wall of the shell by spiders and connected at its upper end to the shell by an uninterrupted annular wall. The lower open end of the shell is defined by a wall having a circular portion proportioned to admit a truncated conical part of a conventional suction-responsive diaphragm assembly. The wall of the circular portion flares inwardly upwardly complementarily to the truncated conical part and provides a press fit between the wall an the truncated conical part. The diaphragm assembly includes a cylindrical hollow boss projecting from the center of the truncated conical part and a link, operatively connected to a diaphragm, to move with the diaphragm, projecting through and beyond the boss. A hollow open ended cylindrical sight tube has an outside diameter to provide a snug sliding fit with the bore defining wall of the open ended sleeve in the housing. The inside diameter of the sight tube provides a press fit with the outside surface of the cylindrical diaphragm assembly boss. The sight tube projects, within the housing, to embrace the boss and projects above the annular wall of the housing a substantial distance. The sight tube has a sight port or ports in and through its wall above the annular wall of the housing and below the upper end of the sight tube. An indicator spool is slidably journalled in the sight tube and connected at its lower end to the diaphragm assembly link. It is normally biased to a position at which it projects beyond the sight port and has indicia on it, visible through the sight port, to indicate the amount of suction being generated in the intake manifold when the diaphragm assembly is connected to the intake manifold. The sight tube has an annular shoulder that abuts the annular wall of the housing when the sight tube is press fitted on the cylindrical boss of the diaphragm assembly, so as to cage the shell between the annular shoulder and an annular flange on the diaphragm assembly.

BRIEF DESCRIPTION OF THE DRAWING

In the drawings,

FIG. 7 is an exploded view, partly in section;

FIG. 8 is an end view in the direction of the line 8—8 of FIG. 7 of the housing; and FIG. 9 is a fragmentary view showing the device mounted on a dashboard of a vehicle.

DESCRIPTION OF THE PREFERRED EMBODIMENT

Figure 1:
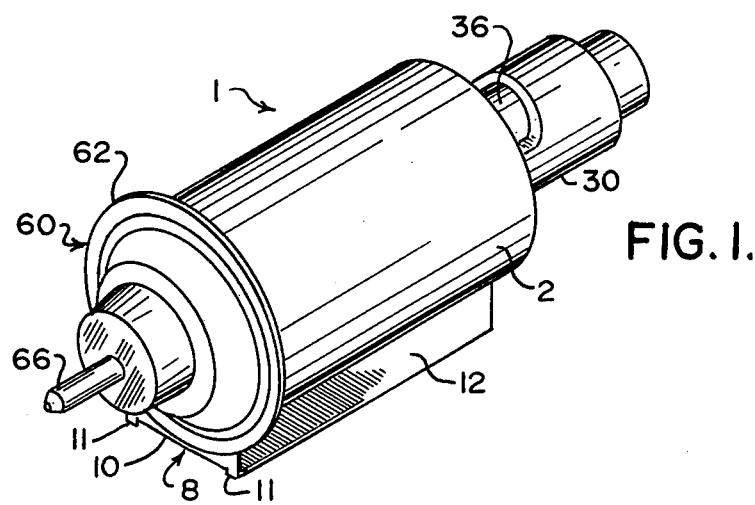
FIG. 1 is a view in perspective from the bottom toward the top of one illustrative embodiment of fuel efficiency display device of this invention.
Figure 2:
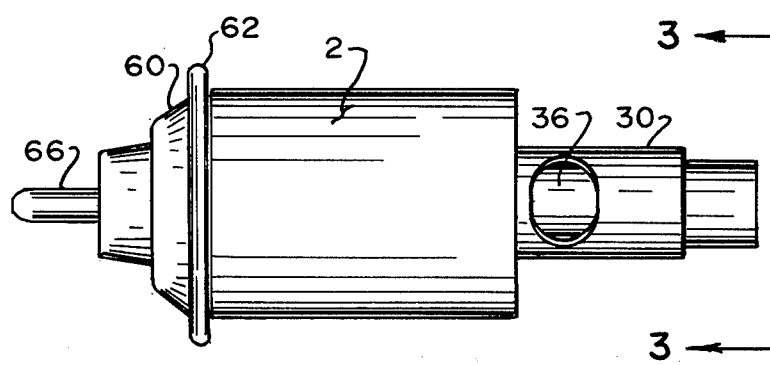
FIG. 2 is a view in front elevation.
Figure 3:
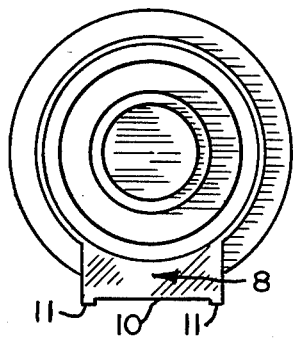
FIG. 3 is an end view taken along the line 3—3 of FIG. 2.
Figures 4, 5:
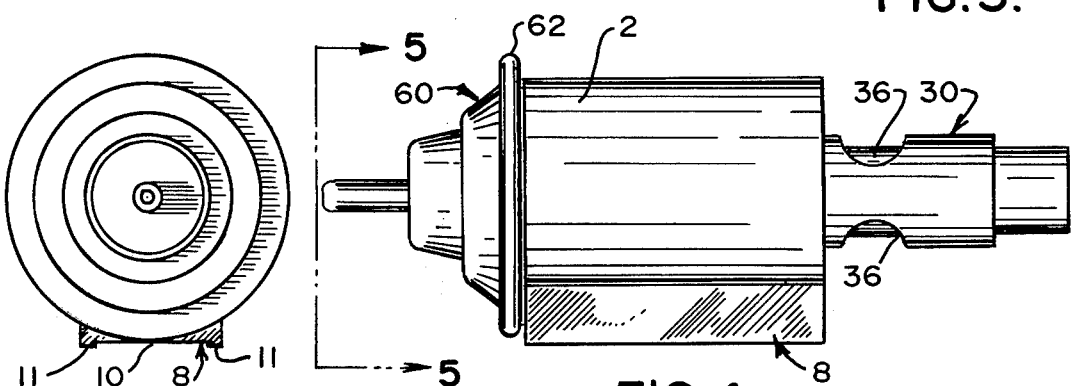
FIG. 4 is a view in side elevation.
FIG. 5 is a view in end elevation in the direction of the line 5—5 of FIG. 4.
Figure 6:
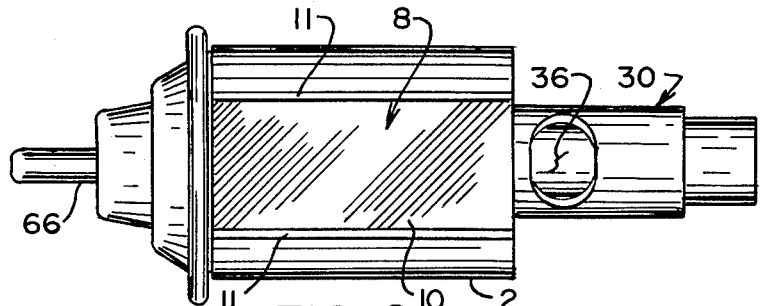
FIG. 6 is a view in rear elevation.

Referring now to the drawings for one illustrative embodiment of fuel efficiency display device of this invention, reference numeral 1 indicates the assembled device, which includes a housing 2 having a shell 3 which includes a peripheral wall 5 defining at its lower end a bottom opening mouth 6. A mounting boss 8, integral with the wall 5 has a flat face 10, external, parallel ribs 11, and parallel side walls 12 that extend as chordal projections from and interrupt a circular portion of the mouth 6, as shown particularly in FIG. 8.

Within the shell 3 is a sleeve 14, with a cylindrical bore defining wall surface 15. The sleeve 14 is spaced from and connected to the inner surface of the shell wall 5 by spiders 17, and is connected to the shell at its end opposite the mouth 6 by an annular wall 19. In the embodiment shown, the sleeve shell spiders and annular wall constituting the housing are all one piece, made of plastic. A circular rim 20 extends around the upper end of the shell.

The mouth 6 is circular in plan except for the interruption of the walls 12. The wall 5 of the shell through the circular portion is chamfered to form an inwardly convergently flaring bearing area 25.

The sight tube 30 is uniformly cylindrical, a wall 31 of the sight tube having an inner surface 32 defining a bore and an outer surface 34 of a diameter to fit snugly within the cylindrical bore of the sleeve. The sight tube is open ended and has a radially extending exterior annular shoulder 38. Between the shoulder 38 and the outer end of the sight tube the sight tube is provided with sight ports 36.

A sight spool 40, adapted to slide in the sight tube 30, has a cylindrical body 41, annular guide bearing ribs 42 and 43, and indicia 44, 45 and 46. A connector ring 47, which, in this embodiment, is integral with the body, projects from one end. Preferably the other end of the spool body is closed. The connector ring 47 has knuckle holes 52 diametrically aligned. A yoke assembly 48, mounted within the connector ring, in this embodiment consists of a pin 49 securely mounted within the knuckle holes 52 and extending between them, a bushing 50 and spacers 51, all as shown in the exploded view in FIG. 7.

A diaphragm assembly 60, in the embodiment shown, is conventional, consisting of a housing 61 made in two parts joined at a radially extending outwardly projecting annular flange 62. The housing has a truncated conical part 63 with a smooth outer surface 64, and a hollow cylindrical boss 65 projecting from a flat surface of the truncated part 63. At the opposite end of the assembly, a suction hose nipple 66 projects. Within the housing 61, and crimped between the two halves of the housing, is a diaphragm 67, connected to a link 68 that projects through and beyond the boss 65. The link 68 has a knuckle hole 69 through it, through which the bushing 50 of the yoke assembly 48 extends to connect the link 68 to the indicator spool 40.

On the other side of the diaphragm from the link 68, is the usual spiral spring 70.

Although the device can be mounted in any position, it is preferable to mount it horizontally on a dashboard 72 or the like. A hose 71 leads from the nipple 66 to a fitting on the manifold of an engine, so that sub-atmospheric pressure is created on the spring side of the diaphragm when the engine is working, causing the diaphragm to move against the bias of the spring 70, to retract the link 68.

The dimensions and the chamfer of the shell wall 5 from the mouth 6 axially inwardly are such as to receive the surface 64 of the truncated conical section 63 of the diaphragm assembly in a tight fit. The inside diameter of the sight tube 30 is such as to give a tight fit about the boss 65, and the length of the sight tube 30 is such that, when the shoulder 38 abuts the outer radial edge of the sleeve 14 the tube projects beyond the sleeve 14 and around the boss 65 to a position close to the surface of the truncated conical part 63 from which the boss projects. In this way, the diaphragm assembly is held securely within the shell 3 both by the area of the fit between the flared section 25 of the shell wall and the surface 64 of the diaphragm assembly and by the caging of the housing between the shoulder 38 of the sight tube 30 and the surface 64, which terminates in the flange 62 of the diaphragm.

The indicia on the sight spool can be in the form of bands of different colors, or writing, or both. The sight ports 36 are so positioned that when the engine is not running, or is running inefficiently, the innermost band is exposed, and when the engine is running efficiently, the action of the diaphragm in retracting the link brings the center band of indicia within the sight port 36.

The mounting of the device can be accomplished by putting double face adhesive tape in the channel defined by the ribs 11. The tape will project beyond the ribs sufficiently far to adhere to a surface in the vehicle, as on the dashboard.

Numerous variations in the construction of the device of this invention, within the scope of the appended claims, will occur to those skilled in the art in the light of the foregoing disclosure. Merely by way of example, the opening through the bottom of the housing shell defined by the walls 12 of the mounting boss can be closed, although the arrangement shown, in which the flange 62 of the diaphragm assembly serves as a closure is simple, effective, and has certain advantages in accommodating the conical section 63 of the diaphragm assembly. The sight spool can be shortened by eliminating the portion projecting from the outer end of the sight tube. A single sight port can be provided. These are, as has been indicated, merely illustrative.

Having thus described the invention, what is claimed and desired to be secured by Letters Patent is:

1. A fuel efficiency display device in the form of an intake manifold suction measuring and display device comprising an elongated housing with a hollow, open bottomed outer shell having a flat faced mounting boss extending lengthwise of and along the outside of said shell, a central, open ended sleeve with a cylindrical bore, said sleeve being spaced from and connected to an inside wall of said shell by spiders and connected at its upper end to said shell by an uninterrupted annular wall, the lower open end of said shell being defined by a wall having a circular portion proportioned to admit a truncated conical part of a suction-responsive diaphragm assembly, said wall flaring inwardly, upwardly through said circular portion complementarily to said diaphragm assembly and proportioned to provide a press fit between said wall and the truncated conical part of said diaphragm assembly, said diaphragm assembly also including a cylindrical hollow boss projecting from said truncated conical part and a link, operatively connected to a diaphragm to move with said diaphragm, projecting through and beyond said boss; a hollow, open-ended cylindrical sight tube, the outside diameter of which is such as to provide a snug sliding fit with the bore defining wall of the said open ended sleeve in the housing, and the inside diameter of which is such as to provide a press fit with the outside surface of the cylindrical diaphragm assembly boss, said sight tube projecting, within said housing, to embrace said boss and projecting above the annular wall of the housing a substantial distance, said sight tube having a sight port in and through its wall above the annular wall of the housing and below the upper end of the sight tube; and an indicator spool, slidably journalled in said sight tube and connected at its lower end to said diaphragm assembly link and normally biased to a position at which it projects beyond the sight port, said indicator spool having indicia on it, visible through said sight port, to indicate the amount of suction being generated in said intake manifold when the diaphragm assembly is connected therewith.

2. The device of claim 1 wherein the sight tube is provided with an outwardly extending shoulder, abutting the upper surface of the sleeve-housing wall.

3. The device of claim 1 wherein the sight tube extends beyond the inner end of the sleeve to engage the circular boss of the diaphragm assembly.

4. The device of claim 1 wherein the indicator spool has annular guide-bearing flanges, and the indicia are in bands of an axial width to fill said sight port, said indicia being radially inboard of said bands to provide clearance between said indicia and said sight tube.

* * * * *